United States Patent
Fu et al.

(10) Patent No.: US 9,639,647 B2
(45) Date of Patent: *May 2, 2017

(54) METHOD OF MAKING SEMICONDUCTOR DEVICE AND SYSTEM FOR PERFORMING THE SAME

(71) Applicant: TAIWAN SEMICONDUCTOR MANUFACTURING COMPANY, LTD., Hsinchu (TW)

(72) Inventors: Chung-Min Fu, Taoyuan County (TW); Wan-Yu Lo, Zhongli (TW); Chin-Chou Liu, Jhubei (TW); Huan Chi Tseng, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,147

(22) Filed: Feb. 18, 2015

(65) Prior Publication Data
US 2015/0161318 A1  Jun. 11, 2015

Related U.S. Application Data

(63) Continuation of application No. 14/039,423, filed on Sep. 27, 2013, now Pat. No. 8,978,003.

(51) Int. Cl.
*G06F 17/50* (2006.01)

(52) U.S. Cl.
CPC ...... *G06F 17/5072* (2013.01); *G06F 17/5077* (2013.01); *G06F 17/5081* (2013.01); *G06F 2217/12* (2013.01); *G06F 2217/14* (2013.01)

(58) Field of Classification Search
CPC ............ G06F 17/5072; G06F 17/5077; G06F 17/5081; G06F 2217/12; G06F 2217/14
USPC ....... 716/122, 123, 124, 129, 130, 131, 132, 716/111, 52, 54, 55
See application file for complete search history.

(56) References Cited

U.S. PATENT DOCUMENTS

| 5,583,788 | A  |     | 12/1996 | Kuribayashi |
|-----------|----|-----|---------|-------------|
| 7,137,081 | B2 |     | 11/2006 | Alpert et al. |
| 7,276,435 | B1 |     | 10/2007 | Pozder et al. |
| 7,509,622 | B2 |     | 3/2009  | Sinha et al. |
| 7,849,436 | B2 | *   | 12/2010 | Young ............... H01L 21/31053 716/54 |
| 8,244,036 | B2 |     | 8/2012  | Hartmann et al. |
| 8,402,412 | B1 | *   | 3/2013  | Chen ................... G06F 17/5072 716/118 |

(Continued)

FOREIGN PATENT DOCUMENTS

| JP | 2010272611 | 12/2010 |
| JP | 2012221104 | 11/2012 |

*Primary Examiner* — Phallaka Kik
(74) *Attorney, Agent, or Firm* — Hauptman Ham, LLP

(57) ABSTRACT

A method of making a semiconductor device includes determining, by a processor, a first pattern density of a first region, determining a second pattern density of a second region, determining a pattern density gradient from the first region to the second region, determining whether the pattern density gradient exceeds a pattern density gradient threshold and performing a placement or a routing of the semiconductor device if the pattern density gradient is less than or equal to the pattern density gradient threshold.

20 Claims, 7 Drawing Sheets

(56) References Cited

U.S. PATENT DOCUMENTS

| | | | |
|---|---|---|---|
| 8,413,080 B1* | 4/2013 | Somerstein | G03F 7/70091 |
| | | | 716/51 |
| 8,543,964 B2 | 9/2013 | Ge et al. | |
| 8,627,245 B1 | 1/2014 | Banerjee et al. | |
| 8,719,755 B2 | 5/2014 | Chou et al. | |
| 8,881,089 B1* | 11/2014 | Alpert | G06F 17/5068 |
| | | | 716/132 |
| 8,918,745 B2* | 12/2014 | Wang | G06F 17/5068 |
| | | | 716/50 |
| 8,978,000 B2* | 3/2015 | Huang | G06F 17/5068 |
| | | | 716/111 |
| 8,978,003 B1* | 3/2015 | Fu | G06F 17/5072 |
| | | | 716/111 |
| 9,147,694 B2* | 9/2015 | Chang | H01L 27/11803 |
| 9,158,883 B2* | 10/2015 | Peng | G06F 17/5081 |
| 9,318,504 B2* | 4/2016 | Chang | H01L 27/11803 |
| 9,418,200 B2* | 8/2016 | Chai | G06F 17/5081 |
| 2002/0177911 A1 | 11/2002 | Waugh et al. | |
| 2003/0196181 A1* | 10/2003 | Sano | G06F 17/5009 |
| | | | 716/111 |
| 2005/0138589 A1 | 6/2005 | Alpert et al. | |
| 2007/0004147 A1* | 1/2007 | Toubou | G06F 17/5072 |
| | | | 438/261 |
| 2007/0245284 A1 | 10/2007 | Sinha et al. | |
| 2008/0072182 A1 | 3/2008 | He et al. | |
| 2008/0178142 A1* | 7/2008 | Takada | G06F 17/5081 |
| | | | 716/52 |
| 2008/0209381 A1* | 8/2008 | Doong | H01L 21/76229 |
| | | | 716/122 |
| 2009/0024978 A1* | 1/2009 | Kim | G03F 1/144 |
| | | | 716/53 |
| 2011/0204470 A1* | 8/2011 | Cheng | G06F 17/5068 |
| | | | 257/499 |
| 2012/0110541 A1 | 5/2012 | Ge et al. | |
| 2012/0202140 A1* | 8/2012 | Uno | G03F 1/24 |
| | | | 430/5 |
| 2013/0227502 A1* | 8/2013 | Fang | G06F 17/5068 |
| | | | 716/102 |
| 2014/0040836 A1 | 2/2014 | Chou et al. | |
| 2014/0042585 A1 | 2/2014 | Peng et al. | |
| 2014/0189625 A1* | 7/2014 | Huang | G06F 17/5068 |
| | | | 716/111 |
| 2014/0282301 A1* | 9/2014 | Wang | G06F 17/5068 |
| | | | 716/54 |
| 2015/0154333 A1* | 6/2015 | Chai | G06F 17/5081 |
| | | | 716/112 |

* cited by examiner

METHOD OF MAKING SEMICONDUCTOR DEVICE AND SYSTEM FOR PERFORMING THE SAME

PRIORITY CLAIM

The present application is a continuation of U.S. application Ser. No. 14/039,423, filed Sep. 27, 2013, which is incorporated herein by reference in its entirety.

BACKGROUND

As integrated circuits (IC) have become smaller and more complex, IC designers use electronic design automation (EDA) software tools to design integrated circuits. Typically, the integrated circuit design process begins with a specification, which describes the functionality of the integrated circuit and may include a variety of performance requirements. Then, during a logic design phase, the logical implementation of the IC functionality is described using one of several hardware description languages such as Verilog or VHDL at the register transfer logic (RTL) level of abstraction. Typically, the EDA software tool synthesizes the abstract logic into a technology dependent netlist using a standard library from an IC manufacturer. The RTL can also describe the behavior of the circuits on the chip, as well as the interconnections to inputs and outputs.

After completion of the logic design phase, the IC undergoes a physical design phase. The physical design phase creates a semiconductor chip design from the RTL design and a library of available logic gates, and includes determining which logic gates to use, defining locations for the logic gates and interconnecting them. The physical design phase includes one or more of a number of steps, including the floorplan stage, placement and routing, Power Performance Area (PPA) violation determination, and Design Rule Change (DRC) violation determination. The physical design phase may include a number of iterations in order to meet these various design constraints (i.e., PPA, DRC, and similar constraints).

Across-chip layout uniformity is a characteristic of semiconductor devices. The semiconductor manufacturing process may yield semiconductor devices that possess physical variations across the device. Physical variations may lead to electrical variations in the semiconductor devices operation. The electrical variations include threshold voltage shifts and mismatched circuits resulting in semiconductor function failure.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Figure 1A:
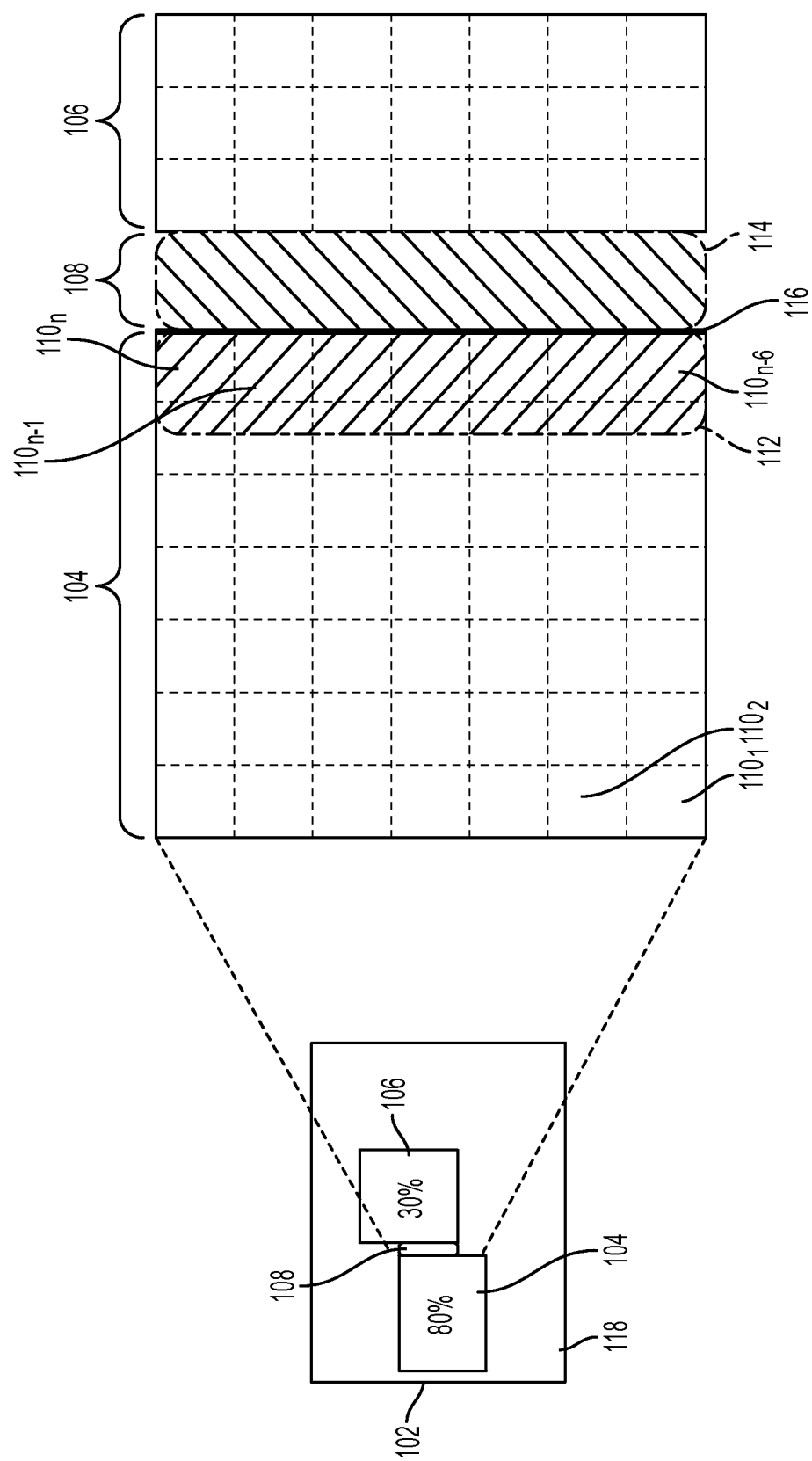
FIG. 1A is a schematic view of a semiconductor device in accordance with one or more embodiments.

The following disclosure provides many different embodiments, or examples, for implementing different features of the disclosed subject matter. Specific examples of components and arrangements are described below to simplify the present disclosure. These are examples and are not intended to be limiting.

This description of the embodiments is intended to be read in connection with the accompanying drawings, which are to be considered part of the entire written description. In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" and "interconnected," refer to a relationship wherein components are attached to one another either directly or indirectly through intervening components, unless expressly described otherwise.

FIG. 1A is a schematic view of a semiconductor device 102 including semiconductor blocks 104 and 106. Semiconductor blocks 104 and 106 are semiconductor regions that include active devices and/or inactive devices. In one or more embodiments, semiconductor block 104 and 106 includes an Intellectual Property (IP) semiconductor core or block. An IP semiconductor core is a design of reusable semiconductor circuit elements that includes embedded processors including processor cores, digital signal processing (DSP) cores, embedded graphical processing units (GPUs), interfaces such as universal serial bus (USB) controllers, ETHERNET, PCI-E, WIFI, WIMAX, or BLUETOOTH, peripherals such as universal asynchronous receiver transmitter (UART) or power management blocks, or memory modules and/or controllers. In at least some embodiments, semiconductor device 102 comprises greater or fewer number of semiconductor blocks.

An intermediate region 108 separates semiconductor block 104 and semiconductor block 106. In one or more embodiments, intermediate region 108 includes an additional semiconductor block. Semiconductor device 102 includes a peripheral region 118 comprising the remaining region of semiconductor device 102.

In at least some embodiments, a portion of the semiconductor block 104, semiconductor block 106, intermediate region 108 or peripheral region 118 is grouped into a region defined by a first cell 112 and a second cell 114. A first cell 112 or second cell 114 is an enclosed region of the semiconductor device that includes one or more tiles. In some embodiments, semiconductor block 104 is divided into a plurality of tiles $110_1, 110_2, \ldots, 110_N$. In some embodiments, the first cell 112 includes an edge region 116 of semiconductor block 104, i.e., that includes a plurality of tiles 110$_{N-6}$, . . . , 110$_N$. In at least some embodiments, the tiles are rectangular, square, hexagonal, or other geometric shapes. In some embodiments, the first cell 112 and second cell 114 include an edge region 116 of semiconductor block 104, a region external of and adjacent semiconductor block 104, or an entirety of semiconductor block 104.

Semiconductor device 102 and each of the regions contained therein, semiconductor block 104, semiconductor block 106, intermediate region 108 and peripheral region 118, each have a pattern density. A pattern density is a density of a particular material occupying a region of the semiconductor device. The density is a ratio of the area occupied by the particular material in a particular region with respect to the total area of the particular region. In at least some embodiments, the particular region is referred to as a tile. The tile is a region or partition of the semiconductor device 102 having a pattern density. In at least some embodiments, the tile is 25 micrometers (μm) by 25 μm in size. In at least some embodiments, the tile has different dimensions.

The pattern density of a given tile is represented by Formula 1:

$$\text{Pattern Density} = \text{Total Area of Material in Tile/Total Tile Area} \quad (1)$$

where the Pattern Density is the density of material in a given tile, Total Area of Material in Tile is the total area of the material in the given tile, and Total Tile Area is the total area of the entire tile.

In some embodiments, the pattern density of a particular material in a particular layer is the ratio of the area occupied by the particular material in the particular layer with respect to the total area of the particular layer. In one or more embodiments, the pattern density for the peripheral region 118 ranges from 20% to 85%. In the particular example, semiconductor block 104 has a pattern density of 80% (0.80) and semiconductor block 106 has a pattern density of 30% (0.30). In some embodiments, the pattern density includes Front End of Line (FEOL) layers. In some embodiments, FEOL layers include individual devices (e.g. transistors, capacitors, resistors, etc.). In some embodiments, the pattern density includes Back End of Line (BEOL) layers. In some embodiments, BEOL layers include metal layers, contacts, bonding sites, and insulating layers.

Figure 1B:
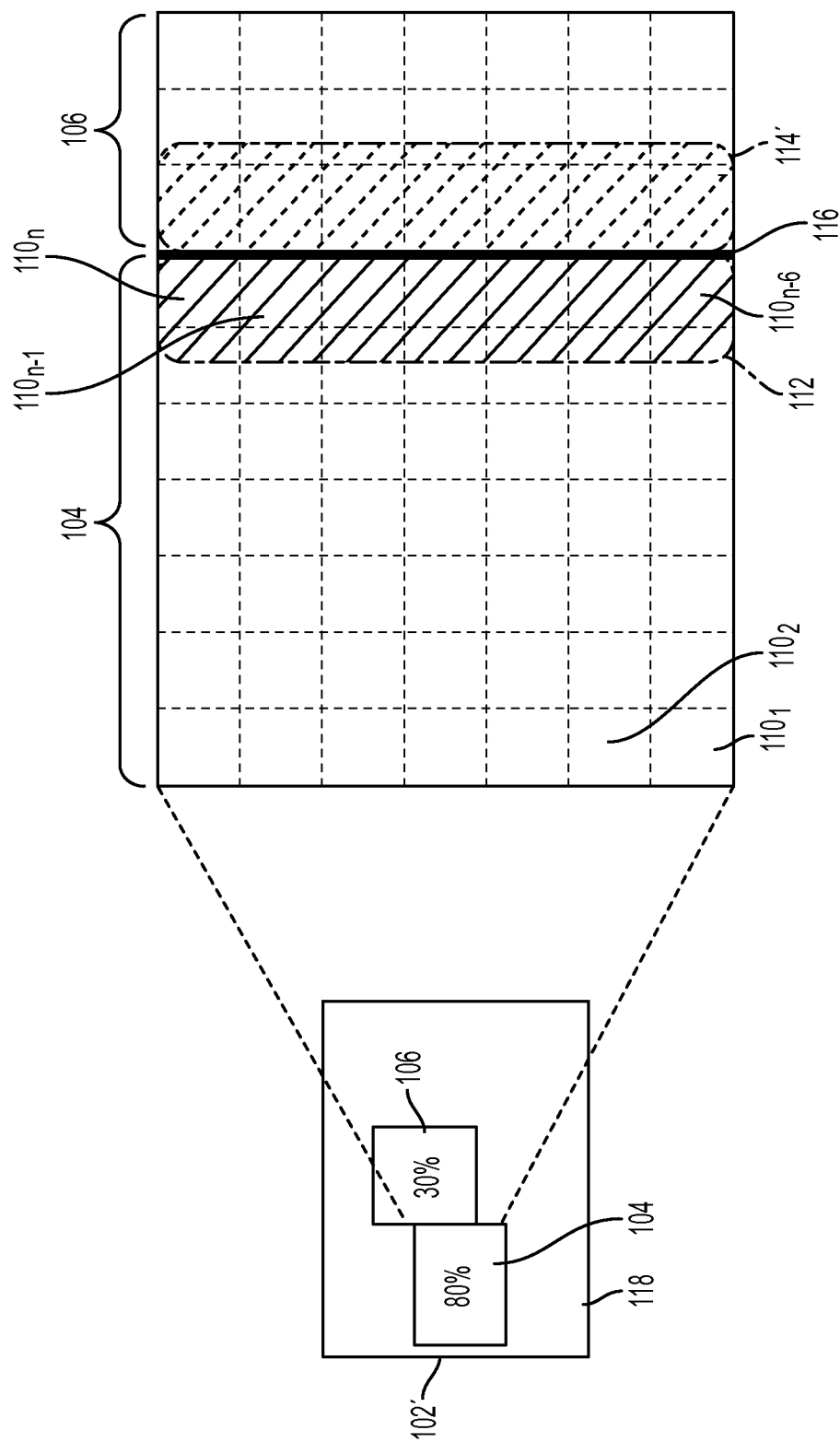
FIG. 1B is a schematic view of a semiconductor device in accordance with one or more embodiments.

FIG. 1B is a schematic view of a semiconductor device 102' according to another embodiment. Semiconductor device 102' includes semiconductor block 104 and semiconductor block 106. Semiconductor block 104 and semiconductor block 106 are adjacent to one another and lack intermediate region 108. Semiconductor device 102' includes a peripheral region 118 and the pattern density for the peripheral region ranges from 20% to 40%. In the particular example, semiconductor block 104 has a pattern density of 80% (0.80) and semiconductor block 106 has a pattern density of 30% (0.30). In at least some embodiments, any portion of the semiconductor block 104, semiconductor block 106 or peripheral region 118 is grouped into a region defined by a first cell 112 and a second cell 114'. A first cell 112 and a second cell 114' are enclosed regions of the semiconductor device that include one or more tiles. In some embodiments, semiconductor block 104 is divided into a plurality of tiles 110$_1$, 110$_2$, . . . , 110$_N$. In some embodiments, the first cell 112 includes an edge region 116 of semiconductor block 104, i.e., that includes a plurality of tiles 110$_N$-6. In at least some embodiments, the tiles are rectangular, square, hexagonal, or other geometric shapes. In some embodiments, the first cell 112 and second cell 114' include an edge region 116 of semiconductor block 104, a region external of and adjacent semiconductor block 104, an entirety of semiconductor block 104.

Figure 2:
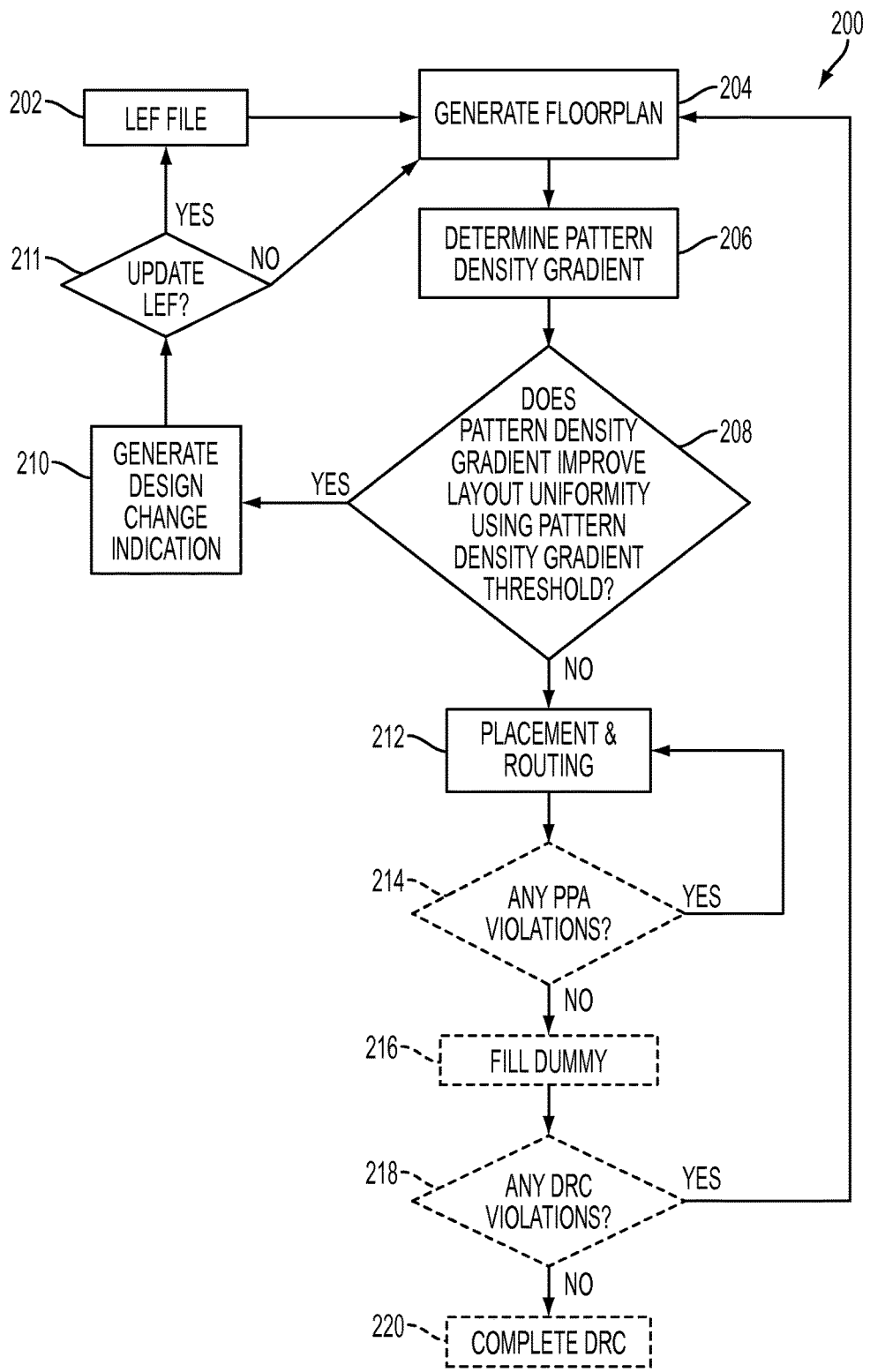
FIG. 2 is a flow chart of a method of making a semiconductor device in accordance with one or more embodiments.

FIG. 2 is a flow chart of a method 200 of making a semiconductor device in accordance with one or more embodiments. In one or more embodiments, method 200 is performed on an electronic design computing device by a user. In at least one embodiment, method 200 is performed via execution of one or more sets of instructions on the electronic design computing device automatically. In one or more embodiments, the electronic design computing device includes more than one computing device.

In operation 202, a Library Exchange File (LEF) is created by an EDA tool. In one or more embodiments, the EDA tool is located on the same computing device as the computing device which implements method 200. In one or more embodiments, the EDA tool is located on a separate computing device from the computing device which implements method 200.

The LEF format is a specification for representing the physical layout of a semiconductor device in an American Standard Code for Information Interchange (ASCII) format. The LEF includes design rules, layer definitions, via definitions, metal capacitance, and other abstract information about the standard cell library in a Computer Aided Design (CAD) tool. In one or more embodiments, the LEF is received from an external portion of the design process and/or edited. In one or more embodiments, the LEF contains a pattern density of a semiconductor device. In one or more embodiments, the LEF initially extracts the pattern density information of a semiconductor from a physical verification tool. In one or more embodiments, the physical verification tool includes Mentor Calibre, Synopsys ICV, or a comparable tool.

In one or more embodiments, the LEF comprises a data structure. In one or more embodiments, the LEF comprises a table. In one or more embodiments, the LEF includes the coordinates of the semiconductor device and/or the coordinates of individual portions of the semiconductor device. In one or more embodiments, the LEF includes pattern densities of the entire semiconductor device. In one or more embodiments, the LEF includes pattern densities of individual portions of the semiconductor device, e.g., one or more cells and/or tiles.

The process flow then proceeds to operation 204 in which the electronic design computing device creates a floorplan of the semiconductor device, e.g., semiconductor device 102, 102'. The floorplan of the semiconductor device is a schematic representation of the tentative placement of the semiconductor blocks. In one or more embodiments, the floorplan includes the semiconductor device area. In one or more embodiments, the floorplan is a partitioned version of the semiconductor device area in axis-aligned tiles to be occupied by semiconductor blocks. The partitioned floorplan is subject to various constraints and requirements of optimization and includes block area, aspect ratios, estimated total measure of interconnects, and similar constraints.

The process flow then proceeds to operation 206 in which the electronic design computing device determines a pattern density gradient. The pattern density gradient 206 is a measurement of the rate of change or gradient of the pattern density between two or more portions of the semiconductor device, e.g., from semiconductor block 104 to 106. In some embodiments, the pattern density gradient is a measurement of the rate of change or gradient of the pattern density between two or more portions of the semiconductor device, e.g., from first cell 112 to second cell 114, 114'. The pattern density gradient is a measure of the across-chip layout uniformity of semiconductor device. In one or more embodiments, the two regions include a combination of two or more of the following: semiconductor block 104, semiconductor block 106, intermediate region 108 or peripheral region 118. In one or more embodiments, the two regions are of the same semiconductor block 104, 106, or the same intermediate region 108 or the same peripheral region 118.

In operation 208, the electronic design computing device determines if the pattern density gradient improves the layout of the semiconductor device 102, 102' based on a pattern density gradient threshold. In one or more embodiments, the pattern density gradient threshold limits the gradient between one region of the semiconductor device 102, 102' and another region of the semiconductor device 102, 102' ensuring a more uniform semiconductor device layout. The pattern density gradient threshold specifies a threshold value that yields a more uniform semiconductor device layout. In one or more embodiments, the pattern density gradient threshold is 25% or greater. In at least some embodiments, the pattern density gradient threshold is a range of values or a threshold value. In at least some embodiments, the pattern density gradient threshold is a threshold value of 30%. If the pattern density gradient is equal to or greater than the pattern density gradient threshold, the process proceeds to operation 210 to attempt to improve the layout of the semiconductor device 102, 102'. If the pattern density gradient is less than the pattern density gradient threshold, the process proceeds to operation 212.

In operation 210, the electronic design computing device causes the generation of a design change indication which indicates whether a design change might result in a more uniform pattern density. In some embodiments, if a design change is indicated, the electronic design computing device attempts to implement internal and/or external design changes which may result in a more uniform pattern density. An internal design change includes changes that are made to an internal region of the particular semiconductor block and results in a change in pattern density. An external design change includes changes that are made to an external region positioned outside of the particular semiconductor block and results in a change in pattern density. In one or more embodiments, an internal design change alters the shape and/or layout of one or more of the semiconductor blocks, e.g., semiconductor blocks 104, 106. In one or more embodiments, an external design change alters the positions of one or more of the semiconductor blocks or filling a region of semiconductor device 102, 102'. In one or more embodiments, the external region includes intermediate region 108 or peripheral region 118. In one or more embodiments, the region includes a tile or a cell.

In operation 211, a determination is made by the electronic design computing device whether to update the LEF. If an internal design change is attempted, the LEF is updated. If an external design change is attempted, the LEF is not updated. If the LEF is updated, the process returns to operation 202. If the LEF is not updated, the operation proceeds to operation 204 and the floorplan is updated by including any design changes. In one or more embodiments, an internal design change is implemented altering the shape and/or layout of one or more of the semiconductor blocks, e.g., semiconductor blocks 104, 106, and the process proceeds to operation 202 to update the LEF. In one or more embodiments, an external design change is implemented altering the positions of one or more of the semiconductor blocks or filling a region of semiconductor device 102, 102' and the process proceeds directly to operation 204 to update the floorplan. In at least some embodiments, the region filled is intermediate region 108. In at least some embodiments, the region filled is a portion of intermediate region 108. In one or more embodiments, the operations of 202, 204, 206, 208, 210, or 211 are repeated to improve the layout uniformity of the semiconductor device 102, 102'. In one or more embodiments, an external design change is attempted before attempting an internal design change.

In operation 212, the semiconductor device 102, 102' is placed and routed by the electronic design computing device. Placement and routing is composed of two steps: placement involves deciding where to place all electronic components, circuitry, and logic elements on the semiconductor device 102, 102'; and routing involves connecting each of the placed semiconductor components with wiring. Routing implements the desired connections while following the rules and limitations of the fabrication/design process. In one or more embodiments, placement and routing use a minimum spanning tree (MST) algorithm to find the minimum number of wires to connect the various electronic components, circuitry, and logic elements on the semiconductor device 102, 102'. In one or more embodiments, placement and routing use a greedy method to select the routing track for each of the electronic components, circuitry, and logic elements on the semiconductor device 102, 102'.

In operation 214, the electronic design computing device determines if there are PPA violations of the semiconductor device 102, 102'. PPA includes three of the major design metrics considered in the current semiconductor device/IC design cycle. The power, performance and area of the semiconductor device 102, 102' are inter-related design parameters of the semiconductor device. The values of the PPA parameters are able to be varied in order to meet the design goals/parameters. If there are PPA violations, the process returns to operation 212, where the PPA violations are fixed. If there are no PPA violations, the process proceeds to operation 216.

In operation 216, the electronic design computing device fills regions of the semiconductor device, e.g., semiconductor device 102, 102', with a dummy metal. A dummy fill is used to correct for any planarity issues in order to achieve a uniform metal distribution and planarization of the semiconductor device. In one or more embodiments, rule-based dummy metal fill is used for inserting dummy metal fill into the semiconductor device.

In operation 218, the electronic design computing device determines if there are DRC violations of the semiconductor device, e.g., semiconductor device 102, 102'. DRC is part of the physical verification and signoff process. In one or more embodiments, the physical verification and signoff process involves Layout Versus Schematic (LVS) check, XOR Checks, Electrical Rule Checks (ERC) and Antenna Checks. DRC is an EDA that determines whether the physical layout of a particular semiconductor device satisfies a series of recommended parameters called design rules. Design rules are specific to a particular semiconductor manufacturing process. In an embodiment, a design rule set specifies certain geometric and connectivity restrictions to ensure sufficient parameter margins to account for variability in the semiconductor manufacturing processes. Violations of the DRC present production issues and affect operation of the semiconductor device. If there are DRC violations, the process returns to operation 204, where the DRC violations are fixed. If there are no DRC violations, the process proceeds to operation 220.

In operation 220, the process continues with other portions of the physical verification and signoff process. Operation 220 may also be performed by a separate system and/or device.

Figure 3:
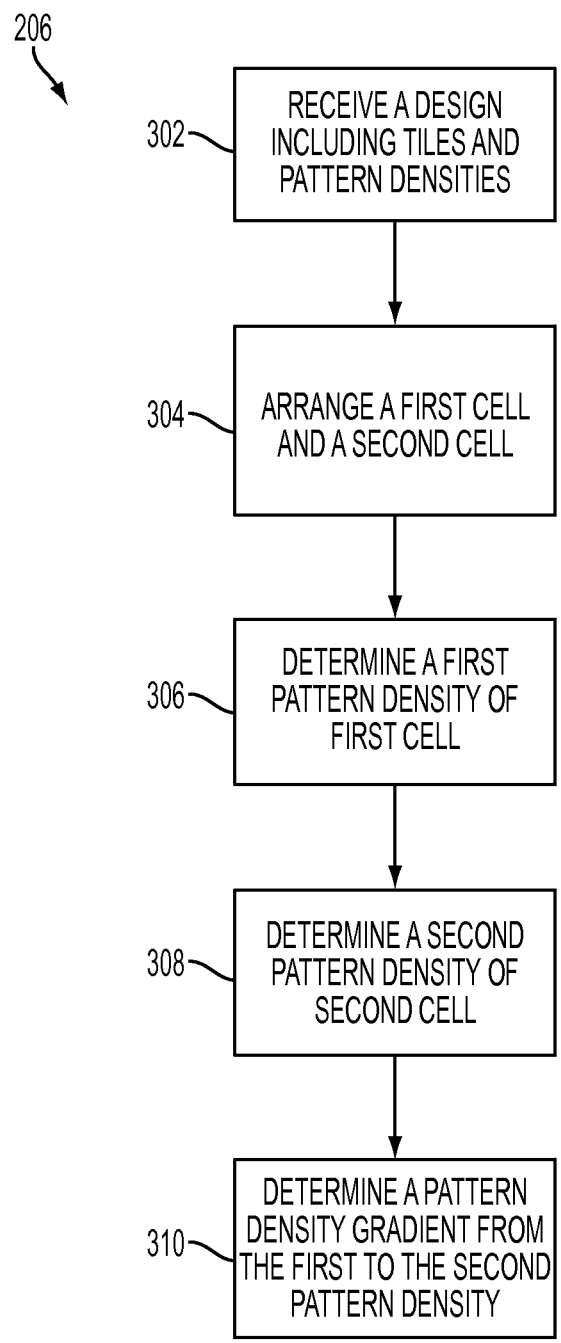
FIG. 3 is a flow chart of a method of determining a pattern density gradient in accordance with one or more embodiments.

FIG. 3 is a flow chart of a method of determining the pattern density gradient by the electronic design computing device in accordance with an embodiment. In operation 302, a semiconductor design of the semiconductor device, e.g., semiconductor device 102, 102', is received by the electronic design computing device. The semiconductor design includes one or more of the tiles and pattern densities previously described in FIGS. 1A and 1B. A pattern density is associated with each individual tile $110_1, \ldots, 110_N$. The individual tiles $110_1, \ldots, 110_N$ are arranged in a grid. In at least some embodiments, the tiles are arranged in other than a grid pattern.

In operation 304, a first cell 112 and a second cell 114, 114' are arranged. A first cell 112 and a second cell 114, 114' include one or more connected tiles. Each of the tiles $110_1, \ldots, 110_N$ has a corresponding pattern density. In one or more embodiments, the first cell 112 and second cell 114, 114' intersect at edge 116. In one or more embodiments, the first cell 112 is adjacent to the second cell 114, 114'. In one or more embodiments, the first cell 112 includes a portion of the semiconductor block 104, and the second cell 114, 114' includes a portion of the semiconductor block 106 and a portion of the intermediate region 108 and a portion of the peripheral region 118. In one or more embodiments, the first cell 112 includes the entire portion of the semiconductor block 104 and the second cell 114, 114' includes the entire portion of the semiconductor block 106. In one or more embodiments, the first cell 112 includes an inner portion of the semiconductor block 104 and the second cell 114, 114' includes an outer portion of the semiconductor block 106. In one or more embodiments, the first cell 112 is an edge zone of (and internal to) the semiconductor block 104 and the second cell 114, 114' is an outer zone of (and external to) the semiconductor block 106, where the edge zone and the outer zone intersect at edge 116. In one or more embodiments, the first cell 112 and the second cell 114, 114' are positioned along the edge of at least one of the following: the semiconductor block 104, the semiconductor block 106, the intermediate region 108 or the peripheral region 118.

In operation 306, the First Pattern Density of the first cell 112 is determined. The Pattern Density of a given cell is represented by Formula 2:

$$\text{Pattern Density} = \Sigma PD_{Ti=(1 \text{ to } N_1)} / N_1 \quad (2)$$

where $PD_{Ti}$ is the Pattern Density for each individual tile $T_i$ of the given cell, $N_1$ is the number of tiles contained within the given cell; and the Pattern Density is an average pattern density of the tiles contained within the given cell. In one or more embodiments, the average pattern density includes any number of tiles and corresponding pattern densities for each tile based upon the size of the given cell. By averaging the pattern density parameters, an impact of extraneous pattern density variables is reduced. In one or more embodiments, the Pattern Density is determined using at least one of the following: the minimum pattern density value from each individual tile contained within the given cell, the maximum pattern density value from each individual tile contained within the given cell or one or more of the values between the maximum and minimum pattern density value from each individual tile contained within the given cell.

In operation 308, the Second Pattern Density of the second cell 114, 114' is determined by the electronic design computing device. The Second Pattern Density is calculated for Formula 2 using the second cell 114, 114'.

In operation 310, the electronic design computing device determines the Pattern Density Gradient from the first cell 112 to the second cell 114, 114'. The Pattern Density Gradient is represented by Formula 3:

$$\text{Pattern Density Gradient} = \text{First Pattern Density} - \text{Second Pattern Density} \quad (3)$$

where Pattern Density Gradient is the difference between the First Pattern Density and the Second Pattern Density.

Figure 4:
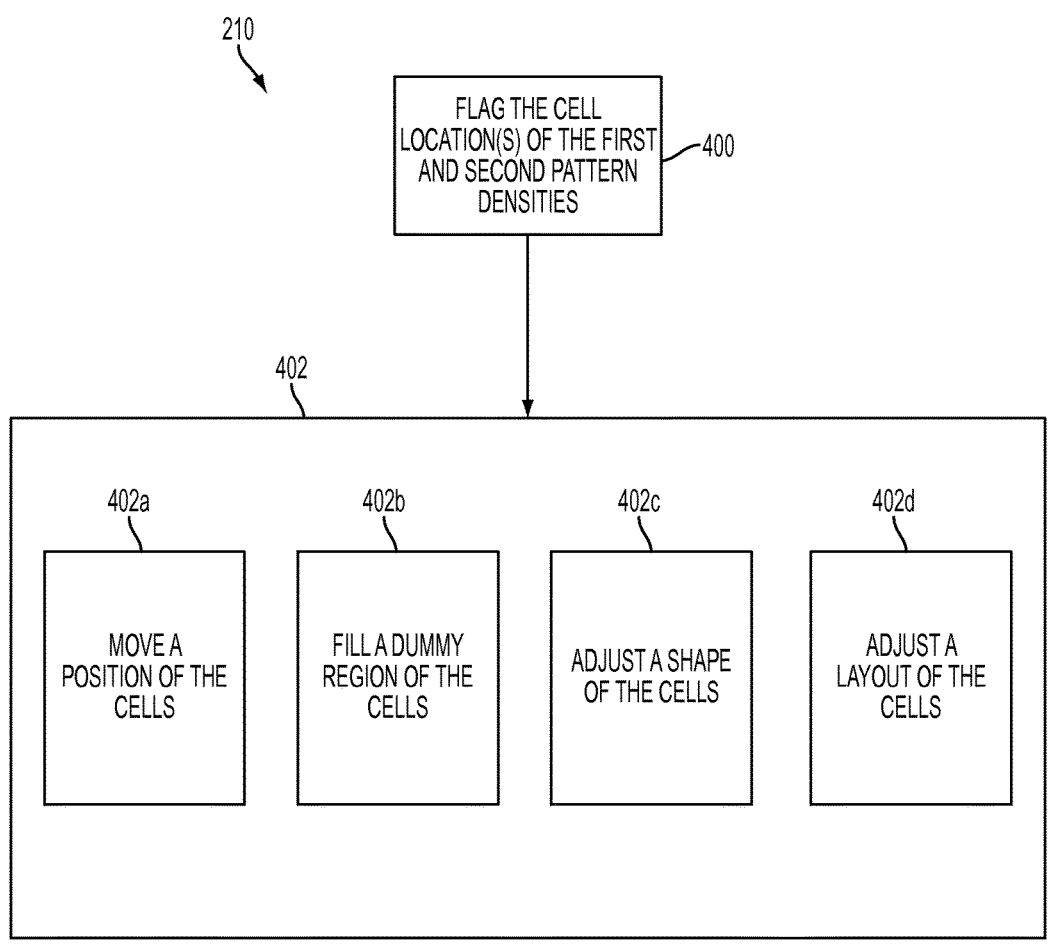
FIG. 4 is a flow chart of a method of generating a design change indication in accordance with one or more embodiments.

FIG. 4 is a flow chart of a method of generating a design change indication by the electronic design computing device accordance with an embodiment. In operation 400, the location of the first cell 112 and/or the second cell 114, 114' are flagged to provide the location of the cell(s) that indicate a design change for method 200. In one or more embodiments, the location of the first cell 112 and/or the location of the second cell 114, 114' are flagged. In one or more embodiments, the location of the inner zone of the first cell 112 and/or the location of the outer zone of the second cell 114, 114' are flagged.

In operation 402 a design change is generated in accordance with any one or more of the following: Move Block 402a, Fill Block 402b, Shape Block 402c, and/or Layout Block 402d. In one or more embodiments, the design change implemented by operation 402 is external to the particular semiconductor block or internal to the particular semiconductor block. An internal design change includes changes that are made to an internal region of semiconductor block and results in a change in pattern density. An external design change includes changes that are made to an external region positioned outside of the semiconductor block and results in a change in pattern density. In one or more embodiments, the external region includes intermediate region 108 or peripheral region 118. In one or more embodiments, the external design change includes Move Block 402a or Fill Block 402b. In one or more embodiments, the internal design change includes Shape Block 402c or Layout Block 402d.

In one or more embodiments, execution of Move Block 402a causes movement of the position of semiconductor block 104 or semiconductor block 106 previously shown in FIGS. 1A and 1B. In one or more embodiments, execution of Fill Block 402b causes filling of the intermediate region 108 of the semiconductor device 102, 102' with a dummy region. In one or more embodiments, execution of Shape Block 402c causes adjustment of the shape of semiconductor block 104 or semiconductor block 106. In one or more embodiments, execution of Layout Block 402d causes adjustment of the layout of semiconductor block 104 or semiconductor block 106. In one or more embodiments, an external design change is attempted before attempting an internal design change. In one or more embodiments, an internal design change is attempted before attempting an external design change. In one or more embodiments, execution of Move Block 402a and Fill Block 402b are attempted before attempting the execution of Shape Block 402c and Layout Block 402d. In one or more embodiments, execution of Move Block 402a, Fill Block 402b, Shape Block 402c and Layout Block 402d are attempted in any order. In one or more embodiments, the execution of Move Block 402a, Fill Block 402b, Shape Block 402c and Layout Block 402d are repeated to improve the layout uniformity of the semiconductor device 102, 102'.

Figure 5A:
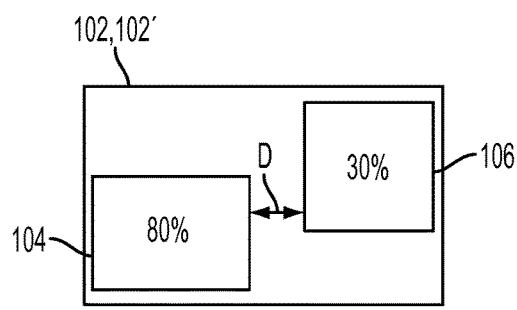
FIGS. 5A-5D are schematic views of a semiconductor device in accordance with one or more embodiments.

FIG. 5A is a schematic view of a semiconductor device, e.g., semiconductor device 102, 102', after execution of Move Block 402a. In one or more embodiments, the position of one or more semiconductor blocks is modified resulting in one or more repositioned semiconductor blocks. In at least this example, the vertical position of semiconductor blocks 104, 106 is maintained constant, whereas the horizontal position of semiconductor blocks 104, 106 is changed resulting in a separation distance D between semiconductor blocks 104, 106.

Figure 5B:
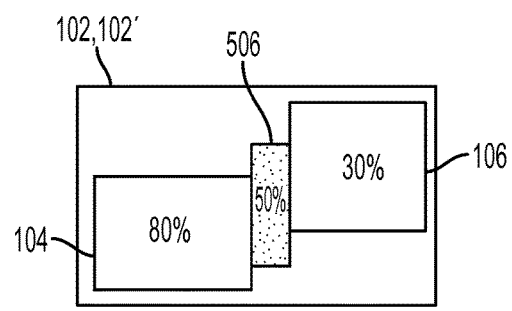

FIG. 5B is a schematic view of a semiconductor device, e.g., semiconductor device 102, 102', after execution of Fill Block 402b. Semiconductor blocks 104, 106 are separated by a fill/filled region 506. A dummy fill is used to correct for planarity issues in order to achieve a uniform metal distribution and planarization of the semiconductor device. In one or more embodiments, filled region 506 is a dummy metal. In at least this particular example, filled region 506 has a pattern density of 50%, whereas previously semiconductor device 102 had an intermediate region 108 which had an assumed value of pattern density. By filling a region located between semiconductor block 104 and/or 106, the pattern density gradient between the semiconductor blocks 104, 106 is changed resulting in a more uniform across-chip layout.

Figure 5C:
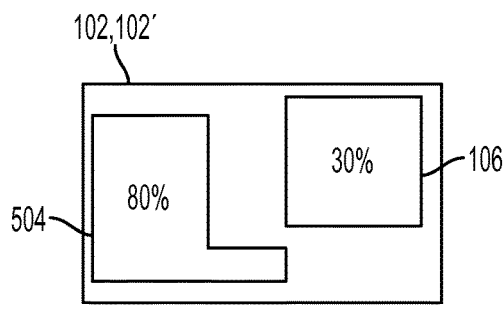

FIG. 5C is a schematic view of a semiconductor device, e.g., semiconductor device 102, 102', after execution of Shape Block 402c. In one or more embodiments, the shape of semiconductor block 104 is adjusted by Shape Block 402c resulting in a semiconductor block 504. By adjusting the shape of semiconductor block 104, the pattern density gradient between the semiconductor blocks 504, 106 is changed resulting in a more uniform across-chip layout.

Figure 5D:
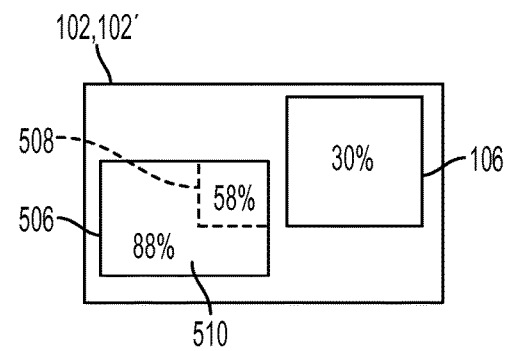

FIG. 5D is a schematic view of a semiconductor device, e.g., semiconductor device 102, 102', after execution of Layout Block 402d. In one or more embodiments, the layout of semiconductor block 104 is adjusted by Layout Block 402d resulting in a semiconductor block 506. In one or more embodiments, semiconductor block 506 has an intermediate region 508 with a pattern density of 58% and another region 510 with a pattern density of 88%. By adjusting the layout of semiconductor block 104, the pattern density gradient between the semiconductor blocks 506, 106 is changed resulting in a more uniform across-chip layout.

Figure 6:
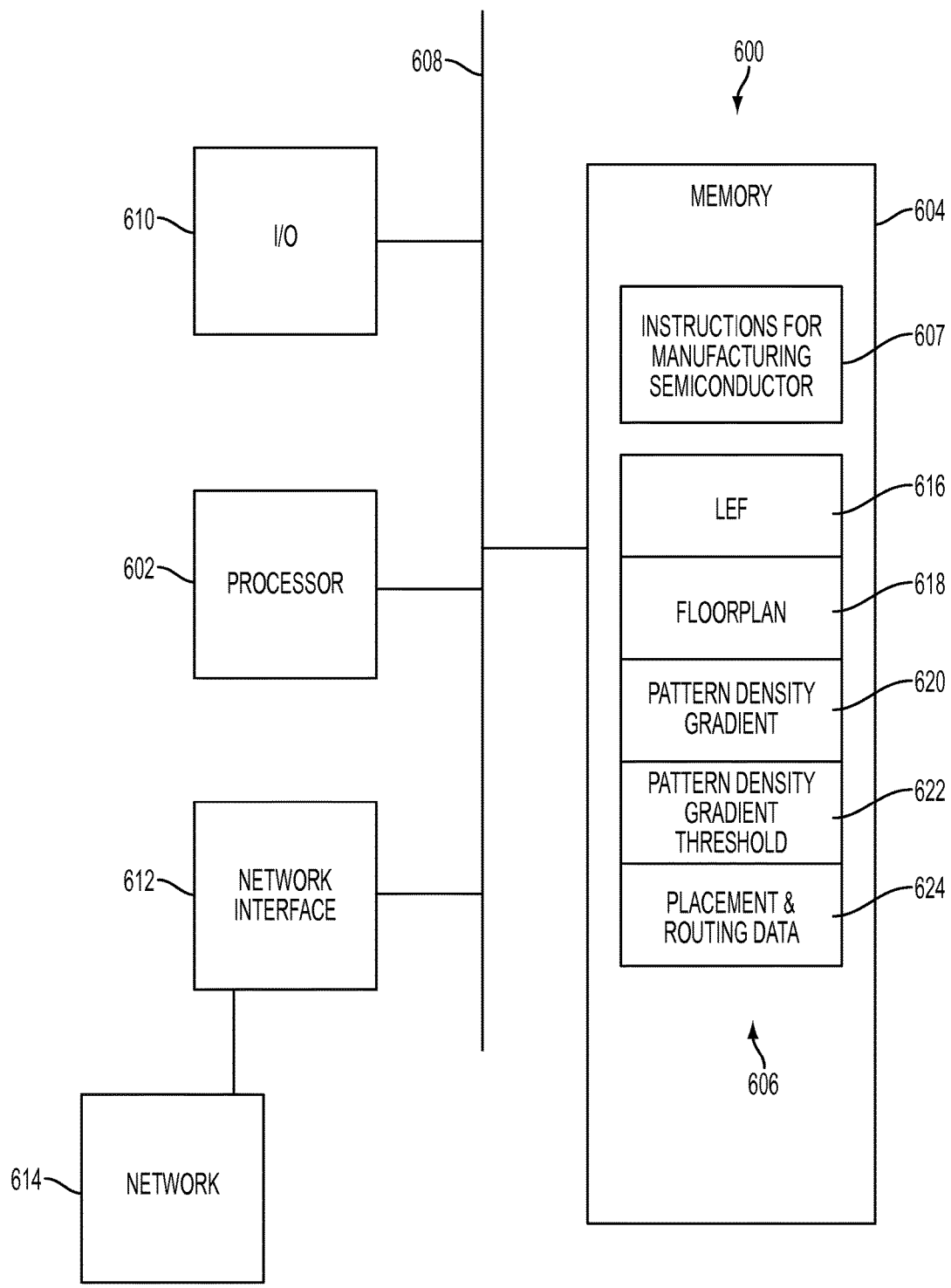
FIG. 6 is a schematic view of a control system for implementing a method in accordance with one or more embodiments.

FIG. 6 is a schematic view of a control system 600 for implementing the method of FIG. 2 in accordance with one or more embodiments. Control system 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with manufacturing machines for producing the semiconductor device 102, 102'. The processor 602 is electrically coupled to the computer readable storage medium 604 via a bus 608. The processor 602 is also electrically coupled to an I/O interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause system 600 to be usable for performing a portion or all of the operations as described in method 200.

In one or more embodiments, the processor 602 is a central processing unit (CPU), a multi-processor, a distributed processing system, an application specific integrated circuit (ASIC), and/or a suitable processing unit.

In one or more embodiments, the computer readable storage medium 604 is an electronic, magnetic, optical, electromagnetic, infrared, and/or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 604 includes a compact disk-read only memory (CD-ROM), a compact disk-read/write (CD-R/W), and/or a digital video disc (DVD).

In one or more embodiments, the storage medium 604 stores the computer program code 606 configured to cause system 600 to perform method 200. In one or more embodiments, the storage medium 604 also stores information needed for performing a method 200 as well as information generated during performing the method 200, such as LEF 616, Floorplan 618, Pattern Density Gradient 620, Pattern Density Gradient Threshold 622, Placement and Routing Data 624, and/or a set of executable instructions to perform the operation of method 200.

In one or more embodiments, the storage medium 604 stores instructions 607 for interfacing with manufacturing machines. The instructions 607 enable processor 602 to generate manufacturing instructions readable by the manufacturing machines to effectively implement method 200 during a manufacturing process.

Control system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Control system 600 also includes network interface 612 coupled to the processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1394. In one or more embodiments, method 200 is implemented in two or more systems 600, and information such as LEF, Floorplan, Pattern Density Gradient, Pattern Density Gradient Threshold, Placement and Routing Data are exchanged between different systems 600 via network 614.

System 600 is configured to receive information related to a LEF through I/O interface 610. The information is transferred to processor 602 via bus 608 to generate LEF. The LEF is then stored in computer readable medium 604 as LEF 616. Control system 600 is configured to receive information related to a floorplan through I/O interface 610. The information is stored in computer readable medium 604 as Floorplan 618. Control system 600 is configured to receive information related to a pattern density gradient through I/O interface 610. The information is stored in computer readable medium 604 as Pattern Density Gradient 620. Control system 600 is configured to receive information related to an pattern density gradient threshold used through I/O interface 610. The information is stored in computer readable medium 604 as Pattern Density Gradient Threshold 622. Control system 600 is configured to receive information related to placement and routing data through I/O interface 610. The information is stored in computer readable medium 604 as Placement and Routing Data 624.

During operation, processor 602 executes a set of instructions to determine Floorplan 618 based on at least LEF parameter 616. For method 200, from at least the Floorplan 618, processor 602 determines the pattern density gradient 620. If the pattern density gradient improves the layout, based on at least the Pattern Density Gradient Threshold 622, processor 602 provides instructions through I/O interface 610 or network interface 612 to generate a design change. If the pattern density gradient does not improve the layout, based on at least Pattern Density Gradient Threshold 622, processor 602 provides instructions through I/O interface 610 or network interface 612 to Placement and Routing Data 624.

One aspect of this description relates to a method of making a semiconductor device including determining, by a processor, a first pattern density of a first region, determining a second pattern density of a second region, determining a pattern density gradient from the first region to the second region, determining whether the pattern density gradient exceeds a pattern density gradient threshold and performing a placement or a routing of the semiconductor device if the pattern density gradient is less than or equal to the pattern density gradient threshold.

Another aspect of this description relates to a method of making a semiconductor device. The method includes generating a floorplan including a plurality of connected tiles and a plurality of pattern densities, wherein each tile has a corresponding pattern density of the plurality of pattern densities. The method further includes determining, by a processor, a first pattern density of a first cell, the first cell including a first portion of the plurality of tiles, determining a second pattern density of a second cell, the second cell including a second portion of the plurality of tiles, determining a pattern density gradient from the first cell to the second cell based on the first pattern density and the second pattern density, determining whether the pattern density gradient exceeds a pattern density gradient threshold and performing a placement or a routing of the semiconductor device if the pattern density gradient is less than or equal to the pattern density gradient threshold.

Still another aspect of this description relates to a system. The system includes a processor and a non-transitory computer readable medium connected to the processor. The non-transitory computer readable medium contains data representing an electronic design. The electronic design includes a plurality of connected tiles and a plurality of pattern densities. Each tile has a corresponding pattern density of the plurality of pattern densities. The non-transitory computer readable medium includes instructions which, when executed by the processor, cause the processor to determine a first pattern density of a first cell, determine a second pattern density of a second cell, determine a pattern density gradient from the first cell to the second cell based on the first pattern density and the second pattern density, determine whether the pattern density gradient exceeds a pattern density gradient threshold and place or route the semiconductor device if the pattern density gradient is less than or equal to the pattern density gradient threshold. The first cell includes a first portion of the plurality of tiles. The second cell includes a second portion of the plurality of tiles.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of making a semiconductor device comprising:
    determining, by a processor, a first pattern density of a first region;
    determining, using the processor, a second pattern density of a second region;
    determining, using the processor, a pattern density gradient from the first region to the second region;
    determining, using the processor, whether the pattern density gradient exceeds a pattern density gradient threshold;
    performing, using the processor, a placement or a routing of the semiconductor device if the pattern density gradient is less than or equal to the pattern density gradient threshold; and
    generating instructions, using the processor, for fabricating the semiconductor device based on the placement or the routing of the semiconductor device.

2. The method of claim 1, wherein determining the first pattern density comprises determining the first pattern density of the first region having a first plurality of connected tiles, and determining the second pattern density comprises determining the second pattern density of the second region having a second plurality of connected tiles, wherein each tile of the first plurality of connected tiles and each tile of the second plurality of connected tiles has a pattern density.

3. The method of claim 1, wherein determining the first pattern density comprises determining an average pattern density of the first region having a first plurality of connected tiles, and determining the second pattern density comprises determining an average pattern density of the second region having a second plurality of connected tiles, wherein each tile of the first plurality of connected tiles and each tile of the second plurality of connected tiles has a pattern density.

4. The method of claim 1, wherein determining whether the pattern density gradient exceeds the pattern density gradient threshold comprises determining whether the pattern density gradient exceeds the pattern density gradient threshold that is 25% or greater.

5. The method of claim 1, wherein determining the second pattern density comprises determining the second pattern density of the second region that is adjacent to the first region.

6. The method of claim 1, wherein determining the first pattern density comprises determining the first pattern density of the first region having a first edge, and determining the second pattern density comprises determining the second pattern density of the second region having a second edge, wherein the first edge intersects the second edge.

7. The method of claim 1, further comprising performing a design change if the pattern density gradient exceeds the pattern density gradient threshold, wherein the design change comprises one or more of:
    moving a position of at least the first region or the second region of the semiconductor device;
    filling a region of at least the first region or the second region of the semiconductor device;
    adjusting a shape of at least the first region or the second region of the semiconductor device; or
    adjusting a layout of at least the first region or the second region of the semiconductor device.

8. A method of making a semiconductor device comprising:
  generating a floorplan comprising a plurality of connected tiles and a plurality of pattern densities, wherein each tile has a corresponding pattern density of the plurality of pattern densities;
  determining, by a processor, a first pattern density of a first cell, the first cell comprising a first portion of the plurality of tiles;
  determining a second pattern density of a second cell, the second cell comprising a second portion of the plurality of tiles;
  determining a pattern density gradient from the first cell to the second cell based on the first pattern density and the second pattern density;
  determining whether the pattern density gradient exceeds a pattern density gradient threshold;
  performing a placement or a routing of the semiconductor device if the pattern density gradient is less than or equal to the pattern density gradient threshold; and
  fabricating the semiconductor device based on the placement or the routing of the semiconductor device.

9. The method of claim 8, wherein generating the floorplan comprises generating the floorplan having the plurality of connected tiles, wherein at least one tile of the plurality of connected tiles has a shape chosen from rectangular, square or hexagonal.

10. The method of claim 8, wherein determining the first pattern density of the first cell comprises determining an average of the pattern density of each tile contained in the first portion of the plurality of tiles, and determining the second pattern density of the second cell comprises determining an average of the pattern density of each tile contained in the second portion of the plurality of tiles.

11. The method of claim 8, wherein determining the second pattern density comprises determining the second pattern density of the second cell that is adjacent to the first cell.

12. The method of claim 8, wherein determining the first pattern density comprises determining the first pattern density of the first cell having a first edge, and determining the second pattern density comprises determining the second pattern density of the second cell having a second edge, wherein the first edge intersects the second edge.

13. The method of claim 8, further comprising performing a design change if the pattern density gradient exceeds the pattern density gradient threshold, wherein the design change comprises one or more of:
  moving a position of at least the first cell or the second cell of the semiconductor device;
  filling a region of at least the first cell or the second cell of the semiconductor device;
  adjusting a shape of at least the first cell or the second cell of the semiconductor device; or
  adjusting a layout of at least the first cell or the second cell of the semiconductor device.

14. A system comprising:
  a processor; and
  a non-transitory computer readable medium connected to the processor, the non-transitory computer readable medium containing data representing an electronic design, the electronic design comprising a plurality of connected tiles and a plurality of pattern densities, wherein each tile has a corresponding pattern density of the plurality of pattern densities, and including instructions, which when executed by the processor, cause the processor to:
    determine a first pattern density of a first cell, the first cell comprising a first portion of the plurality of tiles;
    determine a second pattern density of a second cell, the second cell comprising a second portion of the plurality of tiles;
    determine a pattern density gradient from the first cell to the second cell based on the first pattern density and the second pattern density;
    determine whether the pattern density gradient exceeds a pattern density gradient threshold;
    place or route the semiconductor device if the pattern density gradient is less than or equal to the pattern density gradient threshold; and
    generate instructions for fabricating the semiconductor device based on the placed or routed semiconductor device.

15. The system of claim 14, wherein the instructions which, when executed by the processor, cause the processor to determine the first pattern density of the first cell comprises instructions which, when executed by the processor, to cause the processor to determine an average of the pattern density of each tile contained in the first portion of the plurality of tiles, and the instructions which, when executed by the processor, cause the processor to determine the second pattern density of the second cell comprises instructions which, when executed by the processor, to cause the processor to determine an average of the pattern density of each tile contained in the second portion of the plurality of tiles.

16. The system of claim 14, wherein the instructions which, when executed by the processor, cause the processor to determine the second pattern density comprises instructions which, when executed by the processor, to cause the processor to determine the second pattern density of the second cell that is adjacent to the first cell.

17. The system of claim 14, wherein the instructions which, when executed by the processor, cause the processor to determine the first pattern density comprises instructions which, when executed by the processor, to cause the processor to determine the first pattern density of the first cell having a first edge, and the instructions which, when executed by the processor, cause the processor to determine the second pattern density comprises instructions which, when executed by the processor, to cause the processor to determine the second pattern density of the second cell having a second edge, wherein the first edge intersects the second edge.

18. The system of claim 14, wherein at least one tile of the plurality of connected tiles has a shape chosen from rectangular, square or hexagonal.

19. The system of claim 14, wherein the non-transitory computer readable medium further includes instructions which, when executed by the processor, cause the processor to perform a design change if the pattern density gradient exceeds the pattern density gradient threshold, wherein the design change comprises one or more of:
  move a position of at least the first cell or the second cell of the semiconductor device;
  fill a region of at least the first cell or the second cell of the semiconductor device;
  adjust a shape of at least the first cell or the second cell of the semiconductor device; or
  adjust a layout of at least the first cell or the second cell of the semiconductor device.

20. The system of claim 14, wherein the instructions which, when executed by the processor, cause the processor to determine whether the pattern density gradient exceeds the pattern density gradient threshold comprises instructions which, when executed by the processor, to cause the processor to determine whether the pattern density gradient exceeds the pattern density gradient threshold that is 25% or greater.

* * * * *